UNITED STATES PATENT OFFICE.

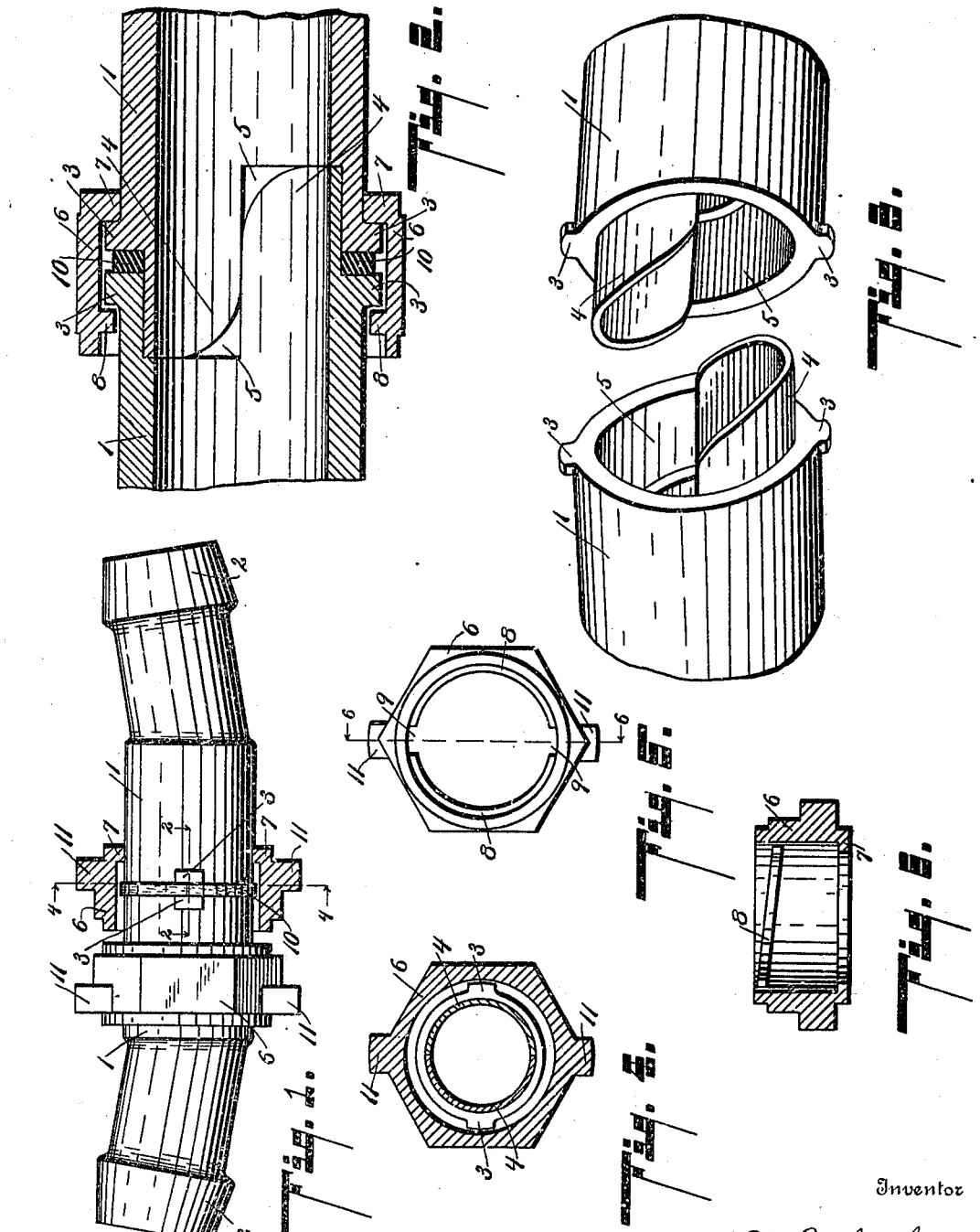

MILLARD F. RICHARDSON, OF KALAMAZOO, MICHIGAN; MARY A. RICHARDSON ADMINISTRATRIX OF SAID MILLARD F. RICHARDSON, DECEASED.

PIPE-COUPLING.

955,828.  Specification of Letters Patent.  Patented Apr. 19, 1910.

Application filed February 3, 1909. Serial No. 475,770.

*To all whom it may concern:*

Be it known that I, MILLARD F. RICHARDSON, a citizen of the United States, residing at Kalamazoo, Michigan, have invented certain new and useful Improvements in Pipe-Couplings, of which the following is a specification.

This invention relates to improvements in pipe couplings.

My improved pipe coupling is especially adapted and designed by me as a coupling for train pipes, although it is desirable for use in any relation for the coupling of pipes.

The main objects of this invention are:

To provide an improved pipe coupling which may be very quickly coupled or uncoupled, and which, when coupled, forms a very perfect and secure joint, and one in which the packing members are protected from direct contact with the steam or other fluid passing through the pipes.

Further objects, and objects relating to structural details, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:

Figure 1 is a side elevation of a structure embodying the features of my invention, one of the coupling sleeves being shown in section. Fig. 2 is an enlarged detail longitudinal section taken on a line corresponding to line 2—2 of Fig. 1. Fig. 3 is a detail perspective view of the two coupling members. Fig. 4 is a cross section taken on a line corresponding to line 4—4 of Fig. 1. Fig. 5 is an end view of one of the coupling sleeves. Fig. 6 is a section thereof taken on a line corresponding to line 6—6 of Fig. 5.

In the drawing, similar reference characters refer to similar parts throughout the several views, and the sectional views are taken looking in the direction of the little arrows at the ends of the section lines.

The hollow coupling members 1, 1, are provided with nipples 2 at their outer ends, adapted to receive the hose or other pipe to be coupled. These are preferably arranged at an angle to the body of the coupling members 1, so that where the structure is used on train pipes, the pipes will hang in their natural position. The coupling members 1 are provided with outwardly projecting lugs 3, and with forwardly-projecting coupling lips 4 at one side and corresponding sockets 5 at the other adapted to receive the lip of the opposite member. The inner edges of the lips 4 are preferably beveled off or curved, so that they slip together more readily in making the joint.

The coupling sleeves 6 are provided with inwardly-projecting annular flanges 7 at one end, adapted to engage the lugs 3 of one member, and with internal spirals 8 at the other, adapted to engage the lugs 3 of the opposite members. At the ends of the spirals are notches 9, adapted to receive the lugs so that the sleeve may be slipped upon the opposite member to engage its lugs.

Between the ends of the coupling members, I arrange a gasket or packing ring 10. This packing ring is mounted upon the lips and is guarded thereby from direct contact with the steam or other fluid passing through the coupling, so that the packing ring is not destroyed, or its effectiveness is not destroyed by contact with the hot steam.

The sleeve 6 is preferably formed to receive a wrench, and is also provided with projections 11, which may be tapped with a hammer or other suitable tool to loosen or tighten the coupling, when it is not desired to use a wrench for that purpose, and on account of the form of the engaging members of the coupling, it can be readily tightened or loosened without the use of a wrench. Each of the coupling members 1 is preferably provided with a coupling sleeve which is loosely mounted thereon, so that it can be slipped back out of the way. This is done so as to insure a complete coupling, being assembled or brought together at all times.

By thus arranging the parts, the coupling may be very quickly united or released, as is desired, and is very strong and durable. The packing ring is so supported and protected that it is not injured by heat, or by direct contact with the fluid passing through the coupling, so that it maintains its efficiency for a long time. The parts may be made of comparatively light material, and, at the same time, are very strong and durable. In addition to these features, the structure is very economical to produce, as it can be produced without the necessity of threading or machining the parts.

I have illustrated and described my invention in detail as embodied in a coupling for train pipes. It is obvious, however, that it is adapted for use in various relations, and is capable of considerable variation in structural details without departing from my invention.

Having thus described my invention, what I claim as new and desire to secure by Letters Patent is:

1. A pipe coupling comprising a pair of hollow members, each member being an integral structure having a plurality of outwardly-projecting lugs at its inner end, and a forwardly-projecting semi-cylindrical lip at one side and a corresponding socket on the other side adapted to receive the lip of the other member, the end of said lip being beveled inwardly; a coupling sleeve for said members, having an internal annular flange adapted to engage the said lugs of one member, and internal spirals adapted to engage the lugs of the opposite member; and a packing ring arranged in said coupling sleeve between the ends of said coupling members and about the said lips thereon.

2. A pipe coupling comprising a pair of hollow members, each member being an integral structure having a plurality of outwardly-projecting lugs at its inner end, and a forwardly-projecting semi-cylindrical lip at one side and a corresponding socket on the other side adapted to receive the lip of the other member and close the circle; a coupling sleeve for said members, having an internal annular flange adapted to engage the said lugs of one member, and internal spirals adapted to engage the lugs of the opposite member; and a packing ring arranged in said coupling sleeve between the ends of said coupling members and about the said lips thereon.

3. A pipe coupling comprising a pair of hollow members, each member being an integral structure having a plurality of outwardly-projecting lugs at its inner end; a coupling sleeve for said members, having an internal annular flange adapted to engage the said lugs of one member, and internal spirals adapted to engage the lugs of the opposite member; a packing ring arranged in said coupling sleeve between the ends of said coupling members and about the said lips thereon; and supporting and protecting semicircular lip members for said packing ring, carried by said hollow members, whereby said packing member is guarded from any direct contact with the fluid in the coupling.

In witness whereof, I have hereunto set my hand and seal in the presence of two witnesses.

MILLARD F. RICHARDSON. [L. S.]

Witnesses:
 CLORA E. BRADEN,
 F. GERTRUDE TALLMAN.